Patented Dec. 19, 1922.

1,439,610

UNITED STATES PATENT OFFICE.

HOWARD N. COPTHORNE, OF CHICAGO, ILLINOIS.

METHOD OF ZINC COATING METAL SURFACES AND ZINC PAINT THEREFOR.

No Drawing. Application filed June 5, 1922. Serial No. 566,148.

*To all whom it may concern:*

Be it known that I, HOWARD N. COPTHORNE, a citizen of the United States, residing at Chicago, in the county of Cook and State of Illinois, have invented certain new and useful Improvements in Methods of Zinc Coating Metal Surfaces and Zinc Paint Therefor, of which the following is a specification.

One object of the present invention is to apply to metal objects, such, for instance, as iron or steel smoke stacks, a protective coating of metallic zinc that will adhere to the metal of the object notwithstanding high temperatures to which the object may be subjected in use; and, accordingly, one feature of the invention consists in thoroughly suspending zinc, in finely subdivided form, for instance, zinc dust of about 350 mesh screen measurement, in a vehicle of a nature which facilitates application to the surface of the object, for instance, by application with a brush, and which will largely volatilize under the high temperature referred to without coking, charring or blistering of the film, and without scaling off, so that the metallic zinc will remain in protective relation to the surface, free to act in its capacity of reducing agent, and unimpaired in its integrity as a coating notwithstanding the dissipation of the volatile constituent of its vehicle.

Another object of the invention is to provide a commercial heat-resisting paint, having for its body a metallic substance of known capacity as a reducing agent, and for its vehicle a liquid composed of a volatile or volatiles which will function as already described, under high temperature, on an object to which the paint is applied; and, accordingly, another feature of the invention resides in a paint compounded of zinc dust, a non-coking waxy substance, such, for instance, as carnauba wax, volatile solvents, such as spirits of turpentine, naphtha or the like, and, preferably, an ingredient such as pine tar to lend tackiness to the mixture.

Subordinate features incident to the preferred embodiment of the invention, though not limiting its scope, reside in the proportions in which the zinc and vehicular ingredients are associated, namely in the proportions of about 60% of zinc to about 40% of the vehicle; also in the proportions of the several vehicular ingredients which make up the 40% vehicle, namely, about 5% of non-coking waxy substance, such as carnauba wax, about 5% of a flux for lending tackiness, such as pine tar, about 30% of volatile solvents, such as spirits of turpentine or naphtha, or both spirits of turpentine and naphtha.

As an illustrative method of practicing the invention, for producing a given quantity of the new heat resisting protective paint, take 5% by weight of carnauba wax, and 5% of pine tar, and melt these together. Thin the fused mixture by adding 15% of spirits of turpentine and 15% of naphtha, or such portions thereof as may be necessary to render the solution of proper consistency for successful performance of the operation of paint grinding after the zinc is added; then add the zinc in the proportion of about 60% and then thoroughly grind the whole mass in a paint mill. If any of the turpentine-naphtha solvent has been withheld before grinding, it may be added after grinding or near the end thereof, or at such times during grinding as may be found desirable. It is not absolutely necessary to use turpentine in equal proportion with the naphtha; it may be used in smaller proportion, or but one of the volatile solvents need be used.

The paint prepared as described, is applied in any suitable manner, as by spraying, or through means of a brush, upon the surface of a metal object, and when so applied and dried in position, it will constitute a surface virtually of metallic zinc, free to act in its protective capacity as a reducing agent; and even though subjected to temperature as high as red heat, it will retain its position on the surface, and will not blister or peel off.

I claim:

1. A heat resisting paint composed of zinc dust in quantity sufficient to form a continuous coating over the surface to which the paint is to be applied, a non-coking wax in quantity sufficient to form a binder for the zinc dust at the time of application, and a volatile solvent in quantity sufficient to produce desired consistency.

2. A heat resisting paint composed of zinc dust in quantity sufficient to form a continuous coating over the surface to which the paint is to be applied, a non-coking wax in quantity sufficient to form a binder for the zinc dust at the time of application, a volatile solvent in quantity sufficient to produce desired consistency, and an ingredient lending tackiness to the paint.

3. A heat resisting paint composed of zinc dust in quantity sufficient to form a continuous covering over a surface to which the paint is to be applied, carnauba wax in quantity sufficient to form a binder for the zinc dust at the time of application, and a volatile hydrocarbon solvent in quantity sufficient to produce desired consistency of the paint.

4. A heat resisting paint composed of zinc dust in quantity sufficient to form a continuous coating over the surface to be painted, carnauba wax in proportion sufficient to form a binder for the zinc dust at the time of application of the paint, a volatile hydrocarbon solvent in quantity sufficient to reduce the paint to the desired consistency, and pine tar in proportion sufficient to lend tackiness to the paint.

5. A heat resisting paint composed of zinc dust in the proportion of 60 parts, non-coking wax in the proportion of about 5 parts, and a volatile solvent in the proportion of about 30 parts.

6. A heat resisting paint composed of zinc dust in the proportion of about 60%, a flux such as pine tar adapted to lend tackiness in the proportion of about 5%, carnauba wax in the proportion of about 5%, and a volatile solvent in the proportion of about 30%.

7. A heat resisting paint composed of zinc dust in proportion sufficient to form a continuous coating upon the surface to be painted, carnauba wax in proportion sufficient to form a binder for the zinc dust at the time of application of the paint, pine tar in proportion sufficient to lend tackiness to the paint, and a volatile solvent such as spirits of turpentine, naphtha, or the like, in proportion sufficient to reduce the paint to the desired consistency.

8. A heat resisting paint composed of the following ingredients in approximately the proportions named, to-wit: carnauba wax 5%; pine tar 5%; spirits of turpentine 15%; naphtha 15%; zinc dust 60%.

9. The method of zinc coating metal surfaces, which consists in applying to the surface zinc dust in a vehicle consisting of a non-coking binder and a volatile solvent, and then volatilizing and driving off the solvent, leaving the zinc dust with its binder as a coating upon the surface.

Signed at Chicago, Illinois, this 1st day of June, 1922.

HOWARD N. COPTHORNE.